Feb. 6, 1962  C. G. GORDON  3,019,805
ELECTRO-HYDRAULIC SERVO VALVE
Filed Sept. 6, 1960  3 Sheets-Sheet 1
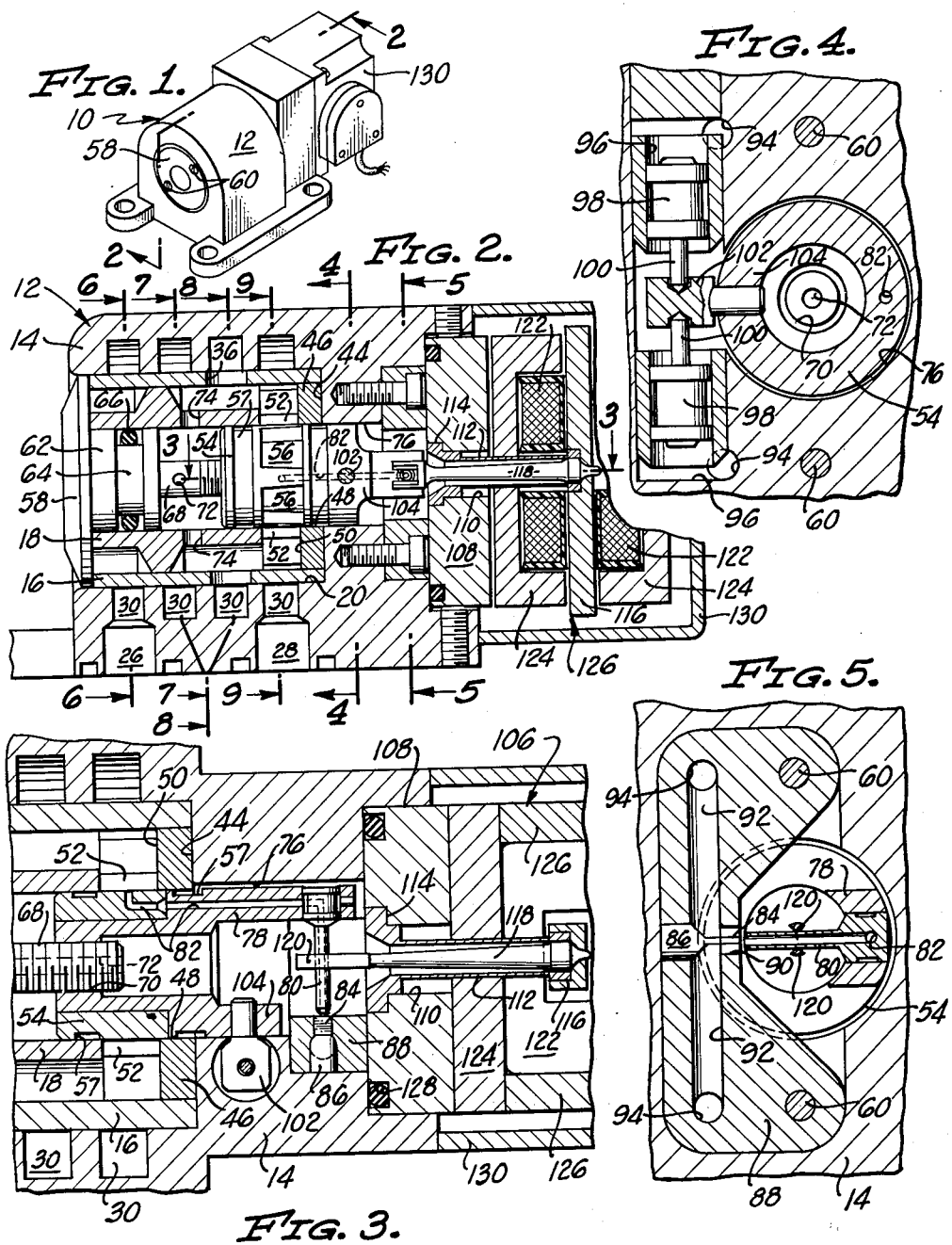
INVENTOR.
CARROLL G. GORDON
BY
ATTORNEY Feb. 6, 1962 C. G. GORDON 3,019,805
ELECTRO-HYDRAULIC SERVO VALVE
Filed Sept. 6, 1960 3 Sheets-Sheet 2

INVENTOR.
CARROLL G. GORDON
BY
ATTORNEY

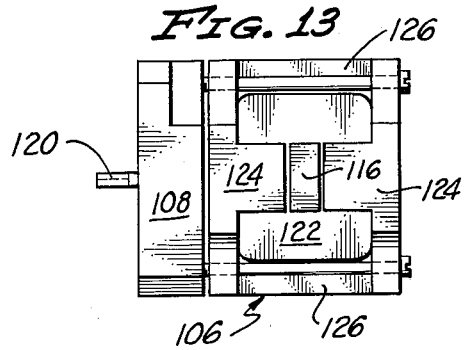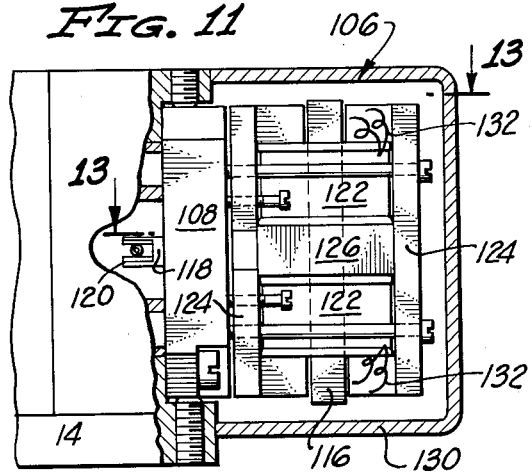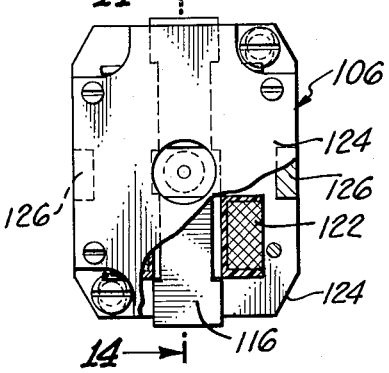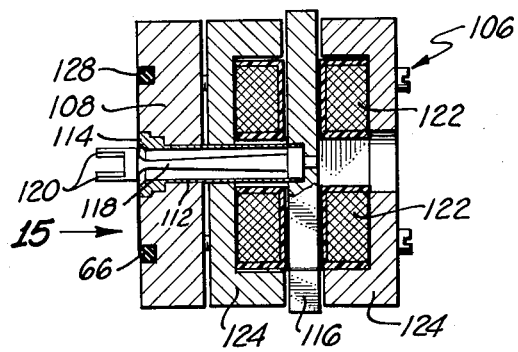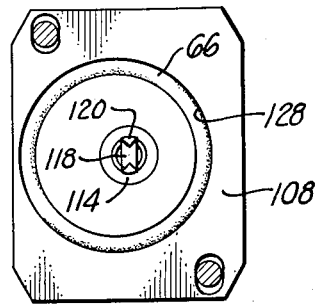
INVENTOR.
CARROLL G. GORDON
BY
ATTORNEY United States Patent Office 3,019,805
Patented Feb. 6, 1962

3,019,805
ELECTRO-HYDRAULIC SERVO VALVE
Carroll G. Gordon, San Mateo, Calif. (3 William Court, Menlo Park, Calif.), assignor of one-half to William F. Stoesser, Mountain View, Calif.
Filed Sept. 6, 1960, Ser. No. 54,180
7 Claims. (Cl. 137—83)

This invention pertains to a new and improved electro-hydraulic servo valve.

Servo valves as a class are commonly employed to control the flow of high pressure hydraulic fluid to and from various types of hydraulic equipment. To be acceptable for a number of different present day applications servo valves must be constructed so as to be comparatively light in weight, so as to be capable of performing reliably even under adverse temperature, pressure and other conditions, and must be capable of being constructed in quantity at a comparatively nominal and reasonable cost. In the past a great many attempts have been made to provide suitable electro-hydraulic servo valves meeting the above and various other market requirements. Although many electro-hydraulic servo valves have been designed and used it is not considered that prior commercial valves of this type have been completely satisfactory.

An object of the present invention is to provide new and improved electro-hydraulic servo valves which meet the foregoing and various related conditions for market acceptability. A still further objective of the present invention is to provide electro-hydraulic servo valves of this type in which pressure derived from hydraulic fluid supplied to these valves is utilized when an electric signal is applied to these valves in order to cause these valves to open or close. Still further objectives of the present invention are to provide electro-hydraulic servo valves which are comparatively simple and inexpensive to construct and which are extremely reliable in operation.

These and various other objects of the present invention as well as many specific advantages of it will be more fully apparent from a detailed consideration of the remainder of this specification including the appended claims and the accompanying drawings in which:

FIG. 1 is a perspective view of an electro-hydraulic servo valve of this invention;

FIG. 2 is a cross-sectional view taken at line 2—2 of FIG. 1;

FIG. 3 is a cross-sectional view taken at line 3—3 of FIG. 2;

FIG. 4 is a partial cross-sectional view taken at line 4—4 of FIG. 2;

FIG. 5 is a partial cross-sectional view taken at line 5—5 of FIG. 2;

FIG. 11 is a partial side elevational view of the valve shown in FIG. 1 showing a cap structure broken away;

FIG. 12 is an end elevational view of certain parts shown in FIG. 11, this view being partially in section;

FIG. 13 is a cross-sectional view taken at line 13—13 of FIG. 11;

FIG. 14 is a cross-sectional view taken at line 14—14 of FIG. 12;

FIG. 15 is an end elevational view of parts employed in an electro-hydraulic servo valve of this invention taken in the direction of the arrow 15 in FIG. 14.

Figure 6:
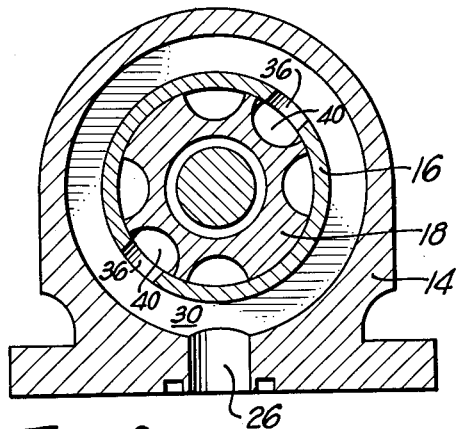
FIG. 6 is a cross-sectional view taken at line 6—6 of FIG. 2.
Figure 7:
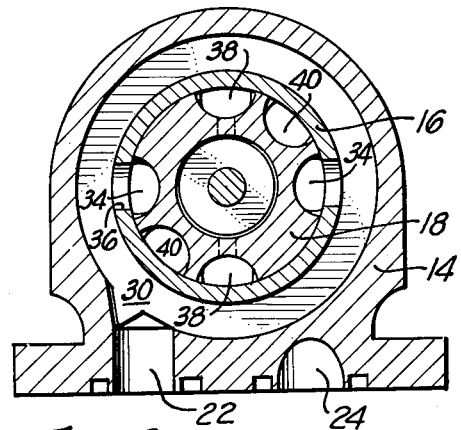
FIG. 7 is a cross-sectional view taken at line 7—7 of FIG. 2.
Figure 8:
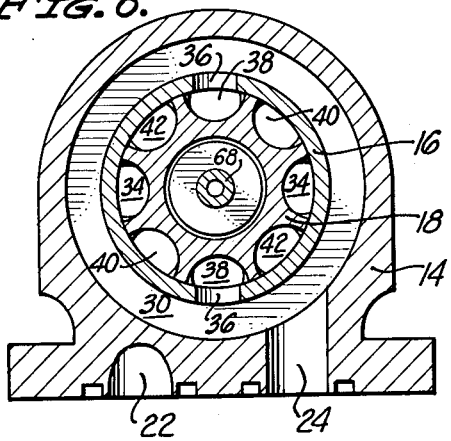
FIG. 8 is a cross-sectional view taken at line 8—8 of FIG. 2.
Figure 9:
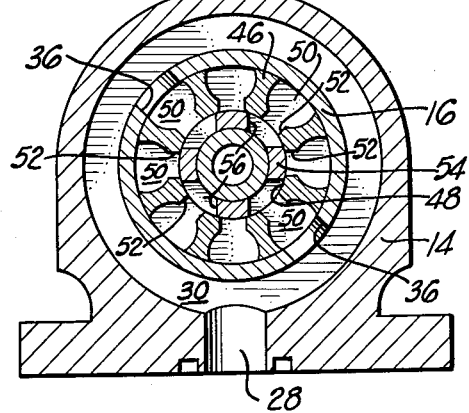
FIG. 9 is a cross-sectional view taken at line 9—9 of FIG. 2.
Figure 10:
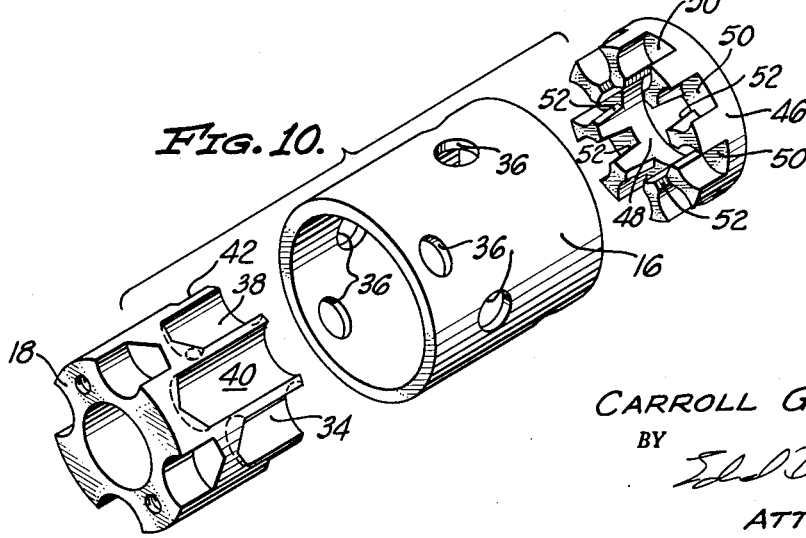
FIG. 10 is an exploded perspective view showing certain parts employed in this valve.

The accompanying drawings are primarily intended to clearly illustrate a presently preferred form or embodiment of this invention. Those skilled in the art to which the invention pertains will realize, however, that the principles set forth in this specification and embodied within the precise electro-hydraulic servo valve illustrated may be embodied in other differently appearing and differently constructed valves. It will be further realized that the principles of this invention can be adapted to such other modified structures through the use or exercise of routine engineering skill or ability.

As an aid to understanding electro-hydraulic servo valves of the present invention it may be stated in essentially summary form that each of such valves includes a balanced type of rotary valve structure, a torque motor, and hydraulic control means operatively connected to both the rotor in the rotary valve and the torque motor in such a way that hydraulic pressure applied to valve during its normal use is directed and utilized so as to cause rotation of the valve rotor in response to an electric signal applied to the torque motor. By this type of structure only a comparatively small amount of force need be developed by the torque motor in order to achieve valve actuation in which a comparatively great amount of force is required to turn the valve rotor employed.

The actual nature of the present invention is best more fully explained by referring directly to the accompanying drawings. In drawings there is shown a hydraulic servo valve 10 of the present invention which includes a complete housing 12 consisting of an outer casing 10, a connecting sleeve 16 and a rotor cylinder 18, all of which parts defining the complete housing 12 are secured with respect to one another against relative motion. Preferably the cylindrical sleeve 16 and the rotor cylinder 18 are of such a character that they are located with respect to one another by using a "shrink-fit" type of process, although they may also be furnace brazed to one another. For assembly purposes the casing 14 is preferably provided with an internal cylindrical cavity 20 against which the exterior of the sleeve 16 fits, and the rotor cylinder 18 is formed so that its interior fits tightly against the interior of the sleeve 16.

The complete housing 12 is formed so that the bottom of the casing 14 includes ports 22, 24, 26 and 28 which are used in order to connect the complete valve 10 to suitable hydraulic lines for use. It is preferred to space these parts so to supply hydraulic fluid under pressure to the valve 10 through the port 22 and to return "spent" hydraulic fluid to a suitable collecting source (not shown) through the port 24, and to connect the ports 26 and 28 to a suitable hydraulic mechanism (not shown) controlled through the use of this valve 10. Because of the nature of the valve 10 the various ports 22, 24, 26, and 28 may be connected in a different manner than this.

In the valve 10 a series of grooves 30 are located around the interior of the cavity 20 in the casing 14, and each of these grooves is connected to one of the ports 22, 24, 26 and 28 by means of an opening 32. It will be noted that the number of the grooves 30 corresponds to the number of the ports provided and that these grooves are isolated from one another by means of the sleeve 16 covering them.

The exterior of the rotor cylinder 18 contains a pair of passages 34, each passage of which is connected to one of the grooves 30 by means of a hole 36; it also contains a pair of other passages 38, each passage of which is connected to another of the grooves 30 by means of a hole 36; it also includes a further pair of passages 40, each passage of which is connected to a further one of the grooves 30 by means of a hole 36; it also contains a still further pair of passages 42, each passage of which is connected to the last of the grooves 30 by means of a hole 36.

All of the passages 34, 38, 40 and 42 are parallel to one another. Further, these passages are also spaced equidistant from one another around the periphery of the exterior of the rotor cylinder 18. With this type of construction the passages 34 are connected to the port 22, the passages 38 are connected to the port 24, the passages 40 are connected to the port 26 and the passages 42 are connected to the port 28. It will be noted that all these pairs of passages are arranged so that those passages within each of the pairs specified are located on opposite sides of the axis of the rotor cylinder 18, and that all of these passages specified are parallel to the axis of this rotor cylinder.

Within the valve 10 preferably the rotor cylinder 18 is not as long as the connecting sleeve 16 so as to provide within the interior of the housing 12 a cylindrical, disclike space (not separately numbered) defined by the interior of part of the sleeve 16, the end of the rotor 18 and a wall 44 located on the casing 14. In the valve 10 this space is occupied by means of a valve plate 46 which is formed so as to have a generally ring-like cylindrical configuration. The interior 48 of this valve plate 46 is, of course, of a cylindrical shape; the diameter of this interior 48 is preferably substantially identical to the diameter of the interior of the rotor cylinder 18 so that the interior 48 of the plate 46 is contiguous with the interior surface of the rotor cylinder 18.

This plate 46 includes a plurality of cut-away portions 50, each of which is aligned with and corresponds to one of the passages 34, 38, 40 and 42. These portions 50 are in communication with the interior 48 of the plate 46 through valve openings 52. These valve openings 52 are preferably of substantially an identical configuration. Further, they are preferably spaced equi-distant from one another at intervals corresponding to 45° of rotation around the axis of the rotor cylinder 18.

Leakage around the plate 46 is preferably prevented by securing it to the casing 14. This may be done in the same ways in which the casing 14, the sleeve 16 and the cylinder 18 may be secured together. When the plate 46 is secured in this manner it forms a part of the housing 12. Preferably the openings 52 are all located in the same plane perpendicular to the axis of the rotor cylinder 18.

This rotor cylinder 18 contains a cylindrical valve rotor 54 which fits closely against the interior 48 of the plate 46 and the interior of the rotor cylinder 18. The rotor 54 includes a plurality of notches 56 which are substantially identically formed and which are preferably spaced equidistant from one another at intervals corresponding to 90° of rotation around the axis of this rotor 54 and which are all located in the same plane perpendicular to the axis of the rotor 54. These notches 56 are so dimensioned so that the exterior of the rotor 54 normally covers the openings 52 leading to the passages 40 and 42 in order to prevent the movement of liquid from the other passages 34 and 38 either into or out of the passages 40 or 42. Moreover, the notches 56 in the periphery of the rotor 54 are proportioned so that only a limited amount of rotation of the rotor 54 is necessary in order to place either the passages 34 in communication with the passages 38 in communication with the passages 42 and the passages 38 in communication with the passages 40. It will be realized that this corresponds to supplying hydraulic fluid under pressure to either the port 26 or the port 28 depending upon the direction of rotation when the valve 10 is connected as previously indicated.

In the valve 10 the rotor 54 may contain peripheral pressure balancing grooves 57 which are parallel to one another and to the plane of the notches 56, and which are spaced from these notches and which extend in planes at right angles to the axis of this rotor. These grooves 57 are designed so as to equalize the pressures on the opposite ends of the rotor surface resulting from leakage of hydraulic fluid along the periphery of the rotor 54 from both ends of the notches 56. Preferably the grooves 57 are spaced equi-distant from the ends of the notches 56. With this type of construction the pressure distribution is balanced over the surface areas of the rotor which are in close proximity with one another. Obviously some leakage will always occur from these notches 56 to the grooves 57 because of the fact that it is virtually impossible to manufacture the rotor 54 so that it can be rotated without having it of slightly smaller dimension than the interior of the cavity within which it is located. If desired, holes (not shown) may be located so as to lead within the rotor 54 from the grooves 57 into the hollow interior of this rotor in order to further equalize pressures.

The position of the rotor 54 with respect to or along the axis of the rotor cylinder 18 is controlled through the use of a closure 58. This closure 58 extends along the outside of an end of the housing 12, and is secured to this housing through the use of screws 60. The closure 58 includes a cylinder 62 which fits closely within the interior of an end of the rotor cylinder 18. Preferably a groove 64 is formed around the periphery of the cylinder 62 in order to hold an elastomeric O-ring 66 so that an effective seal is formed preventing leakage out around the closure 58.

This cylinder 62 is formed integrally with a cylindrically threaded stud 68 which extends in axial alignment with the axis of the rotor cylinder 18 and the valve rotor 54. This rotor 54 is provided with an internally threaded axial opening 70 which is threaded upon the stud 68. Passages 72 extend through the stud 68 so as to place the ends of the rotor 54 in fluid communication with each other. Small holes 74 in the rotor cylinder 18 lead to one of the return passages 38 so as to permit fluid within the interior of the valve 10 to be exhausted from this valve.

The end of the casing 14 remote from the closure 58 is provided with a cylindrical opening 76 of the same diameter as the interior of the rotor cylinder 18 into which the valve rotor 54 extends. An extension 78 on the rotor 54 carries a small flexible tube 80 which projects from it in a radial manner across the axis of the valve rotor 54. Passage 82 in the extension 78 and in the rotor 54 connect the interior of the tube 80 with the periphery of the rotor 54 directly opposite one of the valve openings 52 which is connected through the system of passages and grooves previously described to the port 22 adapted to be used in supplying fluid under pressure to the valve 10. Thus, with this structure at all times, even as the rotor 54 is turned slightly in one direction or another in order to place certain of the valve openings 52 in communication with other of these valve openings 52, fluid under pressure passes through the tube 80.

This tube 80 is directed at a dividing wall 84 formed on a pin 86 secured to a holding plate 88; this wall separates a passage 90 into two equally dimensioned parts. This holding plate 88 is in turn secured to the casing 14 by means of other screws 60; the passage 90 directly faces the open end of the tube 80; other identical passages 92 lead from the passage 90 to identical holes 94 which connect with closed ends of identical cylinders 96. Each of these cylinders carries a piston 98; from each of these pistons 98 there extends a pointed rod 100. These rods 100 bear against opposed sides of a lever arm 102 which extends from a wall 104 on the rotor 54. With this construction the tube 80 is disposed so that under normal conditions in a "null" or closed position of the valve 10 the flow of fluid from this tube is divided into two equal streams by the wall 84. Such streams are conveyed to in back of the pistons 98 in the cylinders 96 so as to position the rotor.

Within the valve 10 the position of the tube 80 is adjusted so as to cause pistons 98 to move with respect to one another causing rotation of the rotor 54 through the use of a torque motor 106. This motor 106 is mounted upon a closure plate 108 which is secured by means of other screws 60 to the casing 14 so as to cover the holding plate 88 and the opening 76. The plate 108 is provided with a centrally disposed opening 110 through which there passes a flexible, resilient tube 112 formed of beryllium copper or the like which is capable of serving as a spring. One extremity of the tube 112 is secured by means of a ferrule 114 to the extremity of the plate 108 adjacent to the valve rotor 54 and the other end of this tube 112 is secured to a movable ferro-magnetic armature 116 within the torque motor 106. A rigid control arm 118 is attached to this armature 116 so as to extend from it through the tube 112. This control arm 118 terminates in two generally triangularly shaped rods 120, each of which has an edge bearing against a side of the tube 80 adjacent to the axis of the valve rotor 54. These rods 120 thus straddle and bear against the tube 80 generally along the axis of rotation of the rotor 54 during the operation of the complete valve 10.

Within the valve 10 tilting of the armature 116 causes pressure to be exerted by the control arm 118 against the tube 112 so as to deflect this tube 80 in such a manner as to create a pressure differential in the cylinders 96 as a result of the dividing action of the wall 84 with respect to the stream of fluid which normally passes under pressure from the tube 80. Such deflection of the tube 112 is caused by an electrical signal being applied to coils 122 in the torque motor 106.

As best indicated in FIGS. 13 through 14 of the drawing, this torque motor 106 includes ferromagnetic pole pieces 124 which clamp these coils 122 and permanent magnets 126 in place with respect to the armature 116 so that this armature passes through the coils 122. Screws 60 are preferably used in securing these pole pieces 124 so as to achieve this type of holding action and so as to secure the entire torque motor 106 with respect to the plate 108. Preferably this plate includes a groove 128 holding another O-ring 66 with respect to the casing 14 so as to seal the torque motor 106 from leakage. An appropriate conventional cap 130 may be positioned surrounding the torque motor 106 and may be secured in any convenient manner to the casing 14.

During the use of the complete valve 10 when an electric signal is supplied to the coils 122 through wires 132 deflection of the tube 112 of course occurs, allowing the control arm 118 to move as previously described. This course deforms the tube 80 as previously indicated and deflects this tube with respect to one side or the other of the wall 84. This of course causes a pressure differently between the two cylinders 96 and this in turn causes movement of the pistons 98 so as to cause rotation of the valve rotor 54. Such rotation results in the notches 56 being turned with respect to the valve openings 52 so as to cause hydraulic fluid to flow from the port 22 to either of the ports 26 or 28 depending upon the direction of the current supplied to the coils 122. Simultaneously of course fluid flows through the other of the ports 26 or 28 out of the device through the return port 24.

As the rotor 54 is rotated in this manner the position of the tube 80 with respect to the rod 120 extending from the control arm 118 is of course changed. As a consequence of this after an initial amount of deflection in the armature 116 the rotor 54 will be caused to rotate so as to "stabilize" the entire valve in a position in which the pressures within the cylinders 96 are substantially equal. When current is no longer supplied to the coils 122 the armature 116 will be returned to its initial position by virtue of the spring-like character of the tube 112. This in turn will cause deflection of the tube 80 again so as to result in a rotation of the rotor 54 through the action previously described involving a pressure differential within the cylinders 96. After a small time increment the tube 86 will then be placed in a neutral position so as the rotor 55 will no longer turn and so that the pressures within the cylinders 96 are equal.

The type of control of a rotary valve described in the foregoing is considered to be very efficient and effective. In effect only a "weak" electric signal is required in order to deflect the armature 116 to a sufficient extent in order to cause temporary deformation of the tube 80 and to cause rotation of the rotor 54 as a consequence of such deformation. Thus, with the present invention control means are provided by which only a very small amount of force is required in order to achieve valve actuation, even with a valve structure such as the structure shown herein which is capable of handling hydraulic fluids at extremely elevated pressures.

It will be further realized that complete electro-hydraulic servo valves as herein described may be easily and conveniently manufactured at comparatively nominal costs and that these valves are constructed in such a manner that they can be operated under extremely adverse circumstances such as under the influence of adverse ambient conditions. It will also be realized that valves as herein described may be easily and conveniently manufactured at a comparatively nominal cost.

Obviously valves as set forth in this specification can be created using a number of different types of balanced rotary valve structures instead of the precise rotary valve structure herein shown and described. This precise structure is more fully set forth in the co-pending application Serial No. 55,653, filed September 13, 1960, entitled Hydraulic Servo Valves. The disclosure of this co-pending application is incorporated herein by reference.

I claim:
1. An electro-hydraulic servo valve which includes: valve means including housing having pressure and other passages formed therein and, said valve means also including other passages formed therein and, said valve means also including valve rotor means rotatably mounted in said housing, said rotor means being capable of being rotated so as to place said pressure passage in communication with at least one of said other passages; hydraulic control means located upon said housing, said hydraulic control means including a flexible tube having a free end and a secured end, said free end of said tube being open, said hydraulic control means also include passage means connecting the interior of said secured end of said tube to said pressure passage, said hydraulic control means further including means for rotating said rotor means in response to a pressure differential and means for receiving hydraulic pressure from said free end of said tube and for creating a pressure differential, said means for receiving being operatively connected to said means for rotating said rotor means; and means for flexing said tube engaging said tube intermediate the ends thereof so as to cause said free end of said tube to move with respect to said means for receiving hydraulic pressure.

2. An electro-hydraulic servo valve as defined in claim 1 wherein said means for flexing said tube includes rods straddling said tube and torque motor means for moving said rods, said torque motor means to be operatively associated with said hydraulic control means and said rods.

3. An electro-hydraulic servo valve as defined in claim 2 wherein said torque motor means includes a moveable armature, and wherein said armature is attached to said rods.

4. An electro-hydraulic servo valve as defined in claim 3 including a flexible spring-like tube, said tube being attached to and supporting said armature.

5. An electro-hydraulic servo valve as defined in claim 1 wherein said secured end of said tube is mounted upon said rotor means.

6. An electro-hydraulic servo valve as defined in claim 1 wherein said means for rotating said rotor means includes lever arm means attached to said rotor means so as to extend therefrom, said lever arm means having opposed sides, cylinder means located adjacent to each of said sides, piston means movably mounted within each of said cylinder means, each of said piston means including a rod engaging a side of said lever arm means, the extremities of said cylinders remote from said rods being connected to said means for receiving hydraulic pressure.

7. An electro-hydraulic servo valve as defined in claim 6 wherein said means for receiving hydraulic pressure includes passage means leading to each of said ends of said cylinders, said passage means being open to hydraulic pressure received from said free end of said tube and being located adjacent to said free end of said tube.

References Cited in the file of this patent

UNITED STATES PATENTS

| | | |
|---|---|---|
| 2,384,221 | Waldie | Sept. 4, 1945 |
| 2,884,907 | Atchley | May 5, 1959 |